(12) United States Patent
Buchler

(10) Patent No.: US 12,309,139 B2
(45) Date of Patent: May 20, 2025

(54) PASSCODE AUTHENTICATION USING A WALLET CARD

(71) Applicant: LexisNexis Risk Solutions, Inc., Alpharetta, GA (US)

(72) Inventor: David Buchler, Boca Raton, FL (US)

(73) Assignee: LexisNexis Risk Solutions, Inc., Alpharetta, GA (US)

( * ) Notice: Subject to any disclaimer, the term of this patent is extended or adjusted under 35 U.S.C. 154(b) by 299 days.

(21) Appl. No.: 17/938,712

(22) Filed: Oct. 7, 2022

(65) Prior Publication Data
US 2024/0121236 A1   Apr. 11, 2024

(51) Int. Cl.
*H04L 9/40*   (2022.01)

(52) U.S. Cl.
CPC .................. *H04L 63/083* (2013.01)

(58) Field of Classification Search
CPC ............... H04L 63/083; H04L 63/0838; H04L 63/0853; G06Q 20/3674
See application file for complete search history.

(56) References Cited

U.S. PATENT DOCUMENTS

| | | |
|---|---|---|
| 10,504,116 B2 | 12/2019 | Collinge et al. |
| 11,295,297 B1* | 4/2022 | Kushner ............ G06Q 20/3224 |
| 2013/0260734 A1* | 10/2013 | Jain ......... H04L 63/08 455/418 |
| 2014/0058937 A1 | 2/2014 | Watson |
| 2016/0292673 A1* | 10/2016 | Chandrasekaran .... G06Q 20/40 |
| 2018/0211249 A1* | 7/2018 | Sims ................... H04W 12/068 |
| 2018/0322473 A1* | 11/2018 | Castinado ............... H04W 4/02 |
| 2019/0295054 A1* | 9/2019 | Purves ................... G06Q 20/36 |
| 2020/0244656 A1* | 7/2020 | Manepalli ............. H04L 63/102 |
| 2020/0245142 A1* | 7/2020 | Manepalli ............. H04L 63/102 |
| 2020/0364697 A1* | 11/2020 | Belleville .......... G06Q 20/3672 |
| 2022/0076244 A1 | 3/2022 | Kannan et al. |
| 2023/0276222 A1* | 8/2023 | Johnson ................ H04W 12/06 455/558 |

* cited by examiner

*Primary Examiner* — Patrice L Winder
(74) *Attorney, Agent, or Firm* — TROUTMAN PEPPER LOCKE LLP; James E. Schutz; Mark Lehi Jones

(57) ABSTRACT

Authentication using a mobile wallet by receiving, at an enterprise server and from a pre-screened user device, a request to access an account on the enterprise server, and sending, to a security server from an enterprise server, a wallet card request to push a wallet card to the pre-screened user device. A valid screening condition of the pre-screened user device is determined, and a wallet card may be generated and pushed to the valid pre-screened user device. Responsive to a request, a passcode may be generated and pushed the generated code to the pre-screened user device wallet. Responsive to confirming, at the security server, that a passcode received from the pre-screened user device wallet matches the generated passcode pushed to the pre-screened user device, a match indication may be transmitted to the enterprise server to initiate authentication of the pre-screened user device for accessing the enterprise server.

20 Claims, 9 Drawing Sheets

PASSCODE AUTHENTICATION USING A WALLET CARD

FIELD

The disclosed technology generally relates to authentication systems and methods, and in particular, to the utilization of a virtual wallet to provide passcode authentication using a pre-screened computing device.

BACKGROUND

A mobile wallet is a virtual wallet that can be used with a mobile computing device such as a smartphone. Depending on the mobile computing device manufacturer, the mobile wallet can be installable or pre-installed on the device and may utilize a dedicated chip (secure element) on the device to store encrypted tokens for secure transactions. The mobile wallet may connect to a user's bank account via the mobile computing device as a convenient way for a user to pay for goods and services with merchants listed with the mobile wallet service provider. Mobile wallets can typically store payment card information associated with a credit card, debit card, coupon, and/or reward card information. Certain mobile wallets can also be used to store a driver's license, a Social Security card, health insurance cards, loyalty cards, hotel key cards, bus or train tickets, concert tickets, etc.

Certain smartphone manufactures use proprietary mobile wallets. Apple Pay, for example, can currently be used only on iOS devices, while Google Pay, PayPal, or Venmo can be downloaded and used with certain iOS and/or Android operating systems.

The term "digital wallet" is often used interchangeably with the term "mobile wallet" in that both digital wallets and mobile wallets can store payment information. However, digital wallets are mostly used for online transactions and do not necessarily require a mobile computing device for operation. Mobile wallets, on the other hand, are typically used in place of a physical wallet or credit card when making in-store purchases and therefore, are usually implemented on easy-to-carry smartphone devices.

As illustrated in FIG. 1, a typical payment authentication process 100 using a mobile wallet installed on a user's smartphone may include (1) adding or linking a credit card (or other payment information) to the mobile wallet on the user's smartphone. The mobile wallet may be linked to the user's personal identification, which can include a code (such as a smartphone lock screen passcode) and/or biometric information such as facial recognition or a fingerprint. To authorize a payment to a vendor using the mobile wallet, a primary account number (PAN) may be (2) submitted to pay servers, which may then request (3) a token from a card network. The card network may request (4) validation of the PAN at the issuing bank. If the PAN information submitted by the mobile wallet matches the account at the bank issuer, a validation may be sent back (5) to the card network, which may generate an associated token (6) that can be returned (7) to the user's mobile wallet, for example, via the pay servers. The token returned to the mobile wallet on the smartphone may then be utilized to complete a transaction with a vendor.

The use of the mobile wallet may provide some additional security for purchases, and while a user's credit card can easily be stolen or duplicated, information stored in a stolen smartphone may be hard to access if the smartphone requires a passcode, fingerprint, etc. Therefore, fraudulent activities can be harder to initiate with mobile wallets. However, mobile computing devices are not immune to viruses, attacks, or other exploits that can take advantage of security vulnerabilities.

While smartphone manufacturers and software engineers continue to plug known security holes, malicious code can bypass permissions or policies and allow an attacker to control the device. Mobile viruses, for example, are typically spread by downloading infected programs or files. Some viruses only become active if the recipient chooses to accept the virus file and run it on the mobile device. Other viruses, when combined with exploits, can be self-propagating worms that may not need user intervention to spread, potentially creating a severe security problem.

In addition to being able to propagate viruses, exploits may be able to directly perform malicious actions on vulnerable devices. Such exploits may be used by attackers to steal information, charge money to the target device's phone bill, or prevent a device from functioning properly. Although vulnerabilities that take advantage of exploits may be fixed if the software vendor responsible for the vulnerability provides a patch or firmware upgrade, such fixes are often costly and time-consuming to release and difficult for users or IT organizations to apply.

A need exists for a secure way of authenticating a user for accessing their online accounts, and certain features associated with a mobile wallet could potentially provide a secure way for such authentication. However, there are several security-related challenges that still need to be overcome for the wide adoption of general multifactor or one-time-passcode authentication using a mobile wallet.

BRIEF SUMMARY

The disclosed technology provides systems and methods that may enable the secure utilization of a mobile wallet for one-time-passcode authentication by conducting mobile computing device pre-screening security checks and/or device health checks before the authentication process using the mobile wallet. Certain exemplary implementations of the disclosed technology may further provide an enhanced level of convenience and security associated with user authentication by the use of a mobile wallet.

Certain exemplary implementations of the disclosed technology may provide a method to pre-screen and authenticate a mobile computing device for passcode authentication using a virtual wallet. The method can include receiving, at a security server, and from an enterprise server, a request to pre-screen a user device for passcode authentication using a virtual wallet on the user device. Responsive to receiving the request, the method can include generating, at the security server, a pre-screening communication channel link for establishing communication with the user device and sending the pre-screening communication channel link to the enterprise server for transmission to the user device. Responsive to activation of the pre-screening communication channel link by the user device, the method can include probing, by a device screener of the security server, the user device to detect one or more security issue conditions, which can include probing for a SIM swap on the user device within a selectable period, and/or probing for a porting of the user device to a new carrier within a selectable period. Responsive to a determination that no security issue conditions are detected at the user device, the method can include sending to the enterprise server an indication of a clear pre-screening result, and receiving, at the security server, and from the enterprise server, a wallet card request to push a wallet card to the user device. Responsive to receiving a wallet card request to push a wallet card to the user device, the method can include generating, by a wallet card generator of the security server, a wallet card, and pushing the generated wallet card to the user device. The method can include receiving, at the security server, and from the enterprise server, a request to push a passcode to the user device wallet. Responsive to the request to push the passcode to the user device wallet, the method can include generating, by a code generator of the security server, a code; and pushing the generated code to the user device. Responsive to confirming, at the security server, that a passcode received from the user device wallet matches the generated code pushed to the user device, the method can include transmitting a match indication to the enterprise server to initiate authentication of the user device for accessing the enterprise server.

Another computer-implemented method is provided for passcode authentication using a virtual wallet. The method can include receiving, at an enterprise server and from a pre-screened user device, a request to access an account on the enterprise server, and sending, to a security server from an enterprise server, a wallet card request to push a wallet card to the pre-screened user device. Responsive to the wallet card request, the method can include determining by the security server, a valid screening condition of the pre-screened user device. Responsive a determination of the valid screening condition, the method can include generating, by a wallet card generator of the security server, a wallet card, and pushing the generated wallet card to the pre-screened user device. The method can include receiving, at the security server, and from the pre-screened user device, a confirmation that the generated wallet card was written to the pre-screened user device. Responsive to a request to push the passcode to the pre-screened user device wallet, the method can include generating, by a code generator of the security server, a code; and pushing the generated code to the pre-screened user device wallet. Responsive to confirming, at the security server, that a passcode received from the pre-screened user device wallet matches the generated code pushed to the pre-screened user device, the method can include transmitting a match indication to the enterprise server to initiate authentication of the pre-screened user device for accessing the enterprise server.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE DRAWINGS

Reference will now be made to the accompanying figures and flow diagrams, which are not necessarily drawn to scale, and wherein.

DETAILED DESCRIPTION

Various example embodiments of the disclosed technology now will be described more fully hereinafter with reference to the accompanying drawings, in which some, but not all embodiments of the disclosure are shown. This technology may, however, be embodied in many different forms and should not be construed as limited to the implementations set forth herein; rather, these implementations are provided so that this disclosure will be thorough and complete, and will convey the scope of the disclosed technology to those skilled in the art.

Certain implementations of the disclosed technology include systems and methods that can facilitate user authentication with an enterprise using a wallet card and secure passcode sent to a virtual wallet (e.g., mobile wallet) installed on a user's mobile computing device (e.g., smartphone). In accordance with certain exemplary implementations of the disclosed technology, the mobile computing device may undergo an initial device health/security pre-screening process prior to activation of the wallet card. In certain exemplary implementations, subsequent device health/security screening may be conducted to prevent subsequent passcodes from being sent to a different device.

Figure 1:
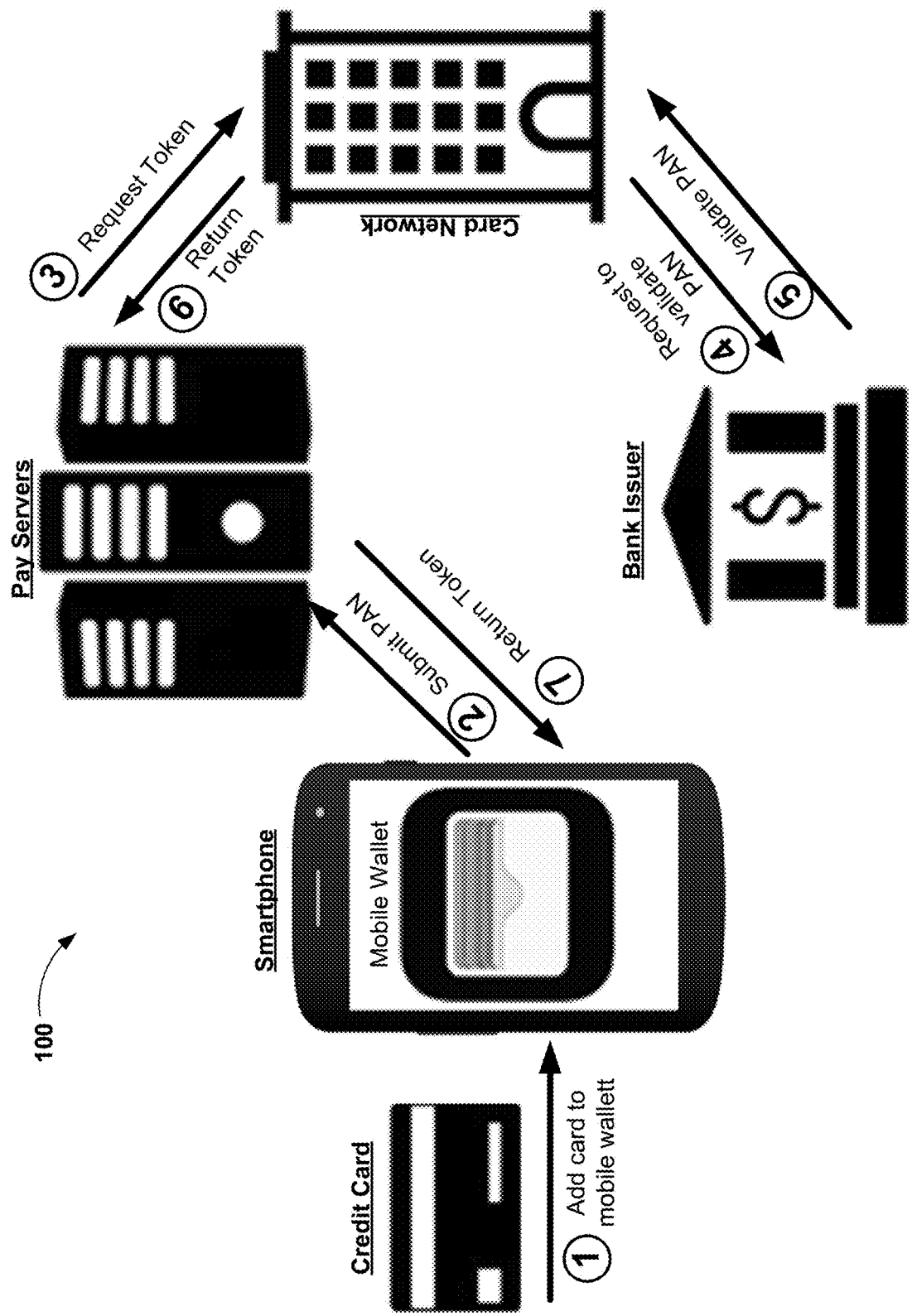
FIG. 1 depicts a typical payment validation process using a mobile wallet on a smartphone via a credit card network and issuing bank.

In contrast to the typical use of a mobile wallet for payment using a pay server, card network, bank issuer, etc., as illustrated in FIG. 1 (and discussed above), the disclosed technology may utilize certain systems and/or methods as illustrated in FIGS. 2-10 to authenticate a user's mobile device for communication with an enterprise server via a passcode sent to the mobile wallet, as will be explained below.

Figure 2:
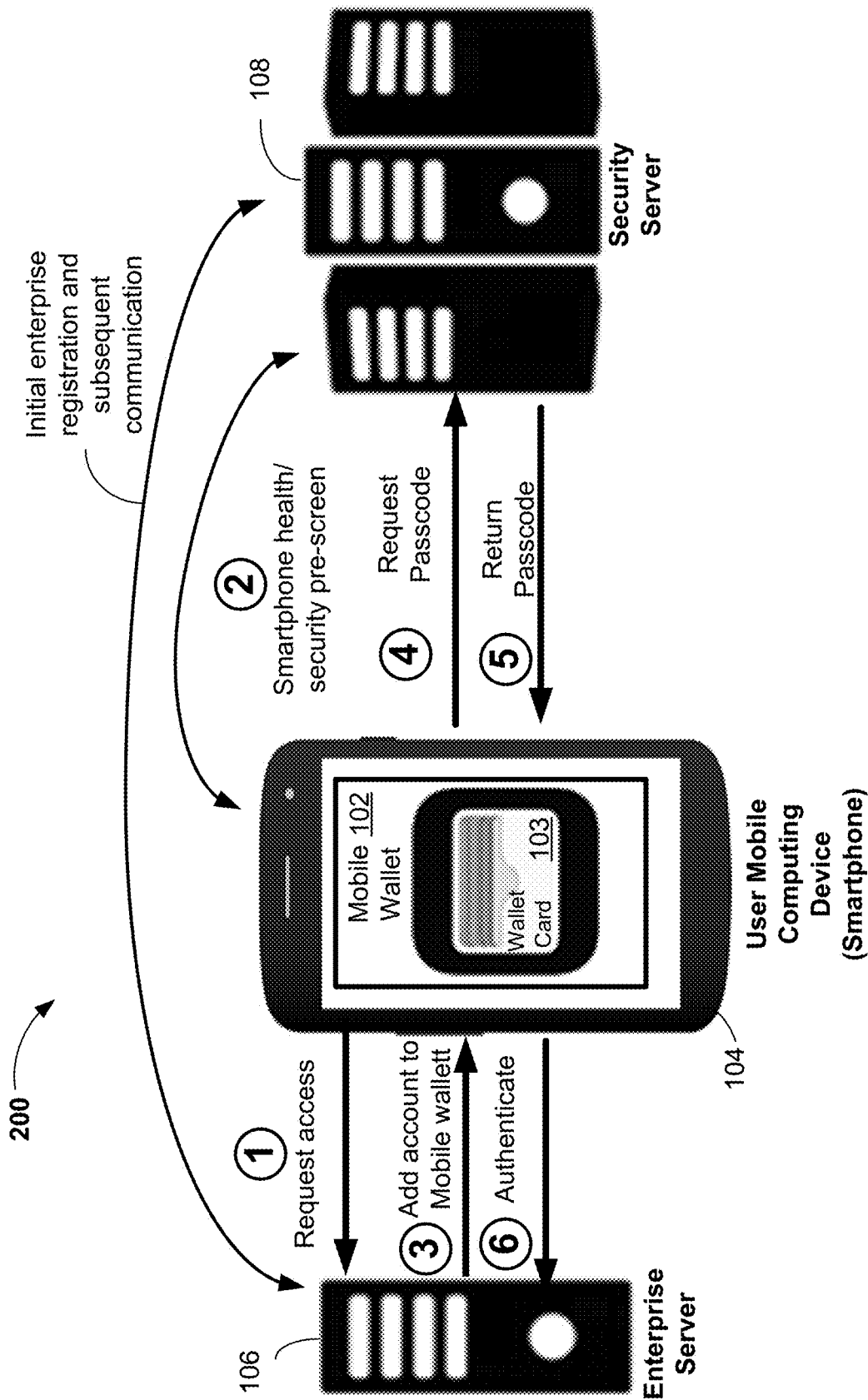
FIG. 2 illustrates an example process according to the disclosed technology, in which a mobile wallet installed on a user's smartphone may be utilized to authenticate the user for account access via a passcode after the smartphone has passed a security/health pre-screening process.

FIG. 2 illustrates an example process 200 according to the disclosed technology, in which a mobile wallet 102 installed on a user's device 104 (such as a smart phone) may be utilized to authenticate the user for access to an enterprise server 106 via a passcode sent to a wallet card 103 after the user device has passed a security/health pre-screening process via a security server 108.

In certain exemplary implementations, the example process 200 illustrated in FIG. 2 can include an initial enterprise registration process between an enterprise server 106 (i.e., owned by or associated with a business or company) and a security system sever 108. In certain exemplary implementations, for example, the security server 108 may establish an account with an enterprise and register the associated enterprise server 106 with the security server 108 for subsequent secure communications. During the enterprise registration process, and according to certain implementations, the security server 108 may communicate with the enterprise server 106 to provide one or more of (a) an initial registration; (b) an initial security screening; (c) provide code (such as JavaScript) for installing on the enterprise website (for facilitating communication among the enterprise server 106, user device 104, and the security server 108); (d) provide wallet templates and/or customized wallets for installing on the user device 104; and/or (e) establish database records for customers of the enterprise for facilitating user device 104 pre-screening and subsequent wallet passcode generation and transmittal. Other housekeeping, secure communication channel setup, etc., may also be performed during the initial enterprise registration process.

In accordance with certain exemplary implementations of the disclosed technology, and with continued reference to FIG. 2, a user device 104 may be utilized to request access to the enterprise server 106. For example, the user may wish to setup a new account with an enterprise and/or securely access an existing account. In response, the enterprise server 106 may provide a hyperlink (for example, on a website hosted by the enterprise server 106) to a particular portal or webpage on the security server 108, for example, to initiate a health/security prescreening process of user device 104 by security server 108 so that passcodes will not be sent to a user device 104 that does not pass certain security/health tests. In certain exemplary implementations, when the user clicks on the security/health test hyperlink, a communication channel may be established between the user device 104 and the security server 108 and a health/security pre-screen process may be performed, for example, by a device screener module on the security server 108, to detect one or more security issue conditions on the user device 104.

In certain exemplary implementations, the health/security pre-screen process may be used to detect a SIM swap on the user device 104 within a selectable period. In certain exemplary implementations, the health/security pre-screen process may be used to detect a porting of the user device 104 phone number to a new carrier within a selectable period for example. In certain implementations, the health/security pre-screen process may include a phone number lookup process, for example, to confirm whether the phone number (and/or other associated device data) is associated with the requesting user and/or the specific user device 104. In this respect, a fraudster who has stolen the user device 104, performed a recent SIM swap, recently ported the user device 104 to another carrier, and/or is not associated with the historical use of the user device 104 may be prevented from receiving a wallet card 103 and/or receiving passcodes for authenticating access to the enterprise server 106 via the user device 104 mobile wallet 102.

Referring again to FIG. 2, and according to certain implementations, once the user device 104 has passed the pre-screening test(s), the security server may send an indication to the enterprise server 106 to initiate or allow the establishment of a mobile wallet account between the user device 104 and the enterprise server 106. In other exemplary implementations, a preliminary mobile wallet account between the user device 104 and the enterprise server 106 may have already been setup, or it may be setup responsive to the initial request by the user device 104 to access the enterprise server 106. In this example implementation, the security server 108 may handle the control of the passcode generation and/or transmittal of the passcode to the user device 104 without requiring sending the indication to the enterprise server 106 to establish the mobile wallet account between the user device 104 and the enterprise server 106.

In accordance with certain exemplary implementations of the disclosed technology, once the user device 104 has passed the pre-screening process and has had a mobile wallet account established (for example, by having wallet card 103 associated with the enterprise installed on the user device 104), the user device 104 may request a passcode (for example, a one-time-passcode) from the security server 108. In response, the security server 108 may generate a unique passcode and send the passcode to both the enterprise server 106 and the user device 104. In certain exemplary implementations, the passcode sent by the security server 108 to the user device 104 may be displayed so that the user may enter the passcode in an appropriate field (either manually or automatically) for sending to the enterprise server 106. In certain exemplary implementations, if the passcode sent by the user device 104 to the enterprise server 106 matches the passcode sent from the security server 108 to the enterprise serer 106, then the enterprise server 106 may authenticate one or more of the user device 104, mobile wallet 102, and/or wallet card 103 for accessing information, accounts, purchases, etc., via the enterprise server 106. Otherwise, if the passcodes do not match, the enterprise server 106 may not authenticate the user device 104 and alternate authentication may be required for the user device 104 to access protected information on the enterprise server 106.

Figure 3:
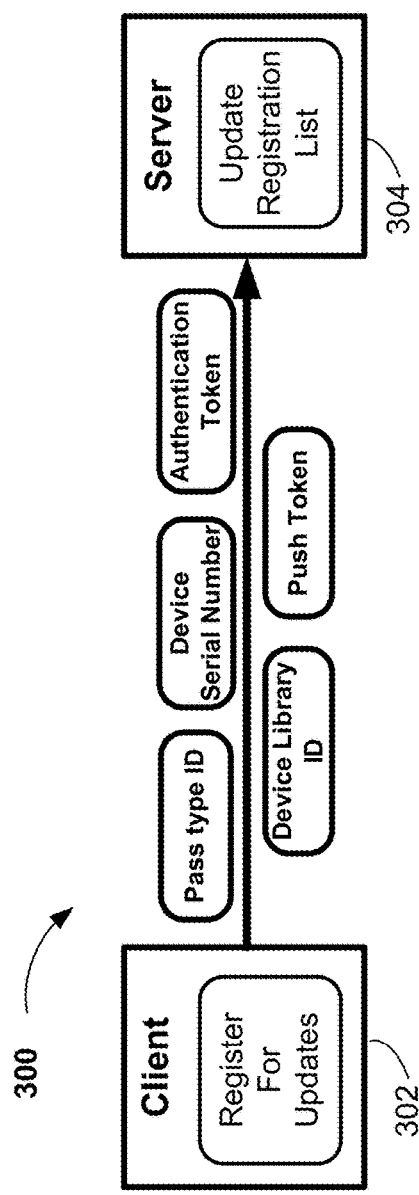
FIG. 3 illustrates certain security features of a virtual wallet card which can prevent transferring the wallet card or subsequent updates to another device.

FIG. 3 illustrates certain security features 300 of a virtual wallet card which can be used to authenticate a client 302 (which may be a user device 104 as discussed above with respect to FIG. 2) for accessing a server 304 (which may be an enterprise server 106 and/or a security server 108 as discussed above with respect to FIG. 2) and/or for prevent transferring the wallet card or subsequent updates/passcodes to another device. For example, the client 302 may register for updates (including but not limited to registering for a new one-time-passcode) by providing specific information about the client, such as device serial number, ICCID serial number, IMSI number, MAC address, IP address, IDFA, AAID, pass type ID, authentication token, push token, device library ID, and/or other unique identification information associated with the client 302. The server 304 may use such specific information to update a registration list that may be used in the pre-screening and/or a subsequent screening process, as discussed above with respect to FIG. 2.

Figure 4:
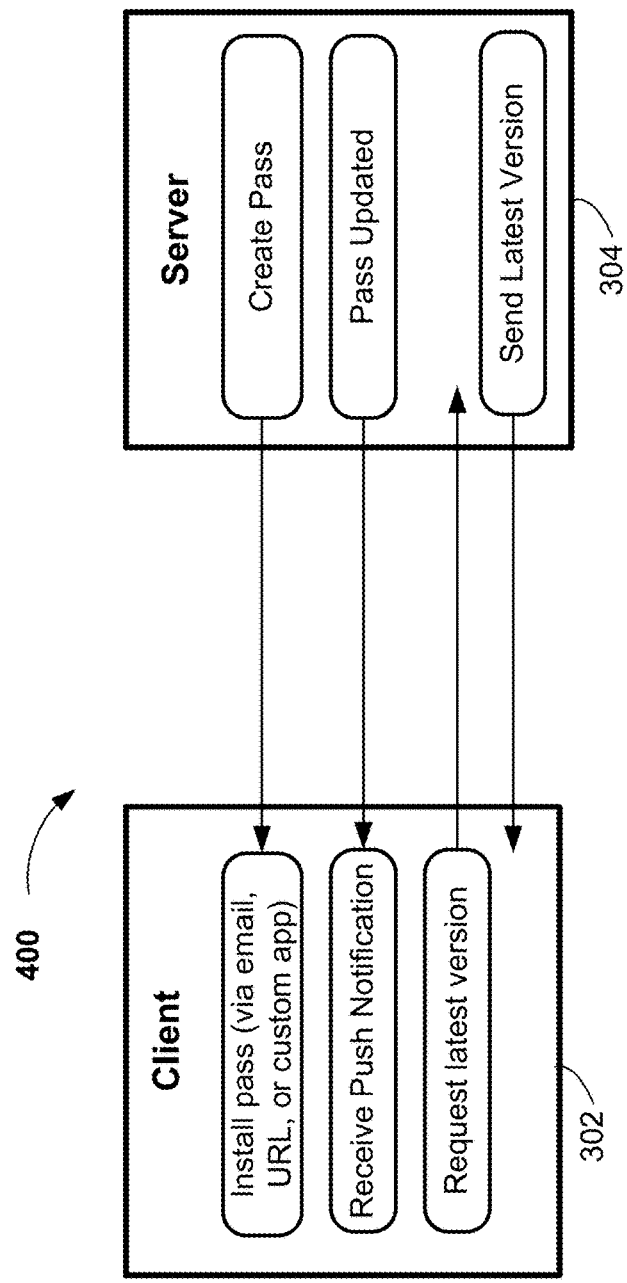
FIG. 4 illustrates a wallet pass creation, in accordance with an exemplary implementation of the disclosed technology.

FIG. 4 illustrates a wallet pass creation process 400 among a client 302 and a server 304, in accordance with an exemplary implementation of the disclosed technology. In a broad sense, the server 304 may create a pass, which may be installed on the client 302. When the pass is updated at the server 304, the client 302 may receive a push notification. The client 302 may further request the latest version of the pass from the server 304, and provided that all other security checks have passed, the server 304 may send the latest version of the pass to the client 302.

Figure 5:
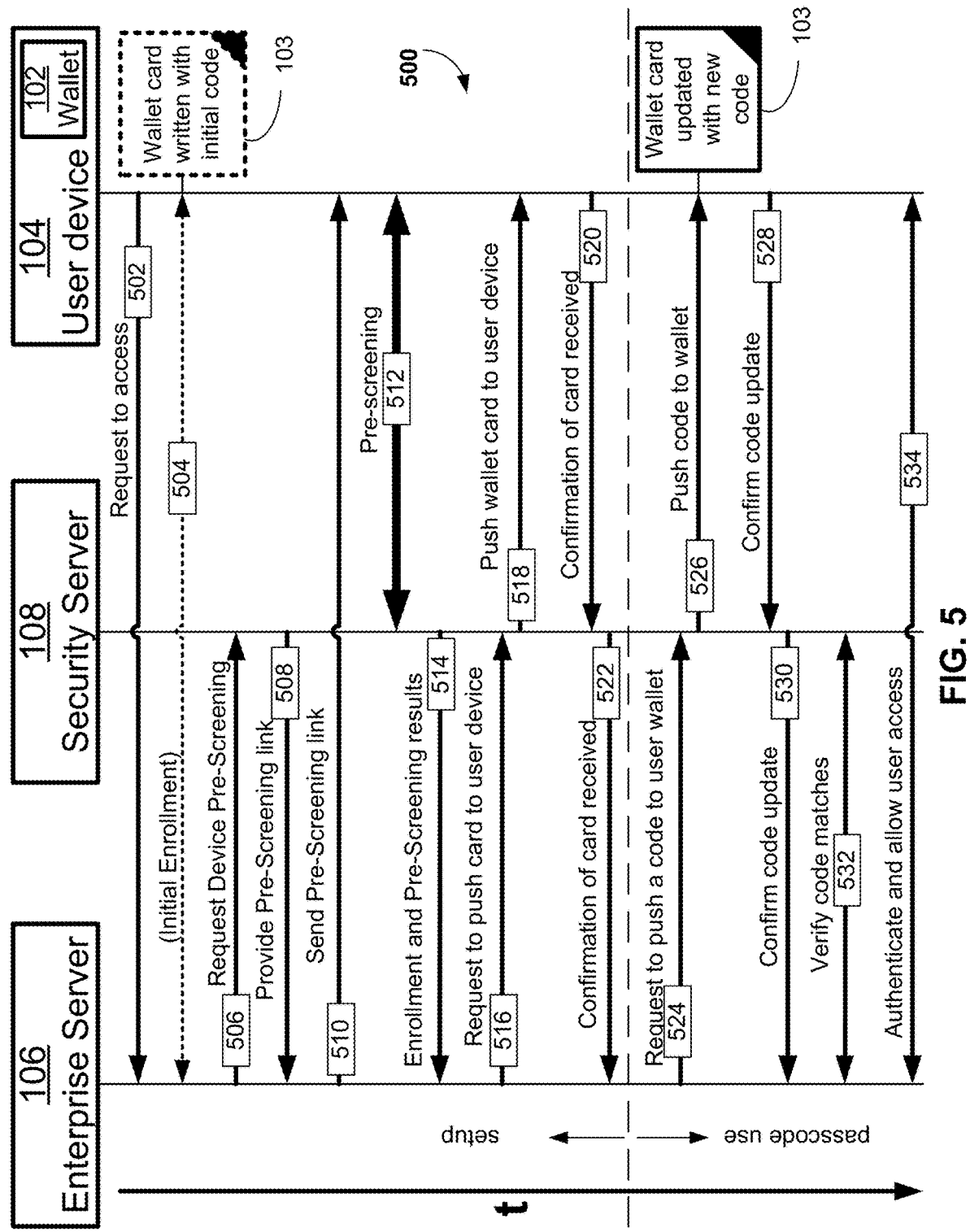
FIG. 5 is an example process timeline for utilizing a virtual wallet for authentication, including steps of pre-screening a user device and using the pre-screened device for receiving one-time-passcodes (OTP) for user authentication, in accordance with certain exemplary implementations of the disclosed technology.

FIG. 5 is an example process 500 timeline for utilizing a virtual wallet for authentication, including steps of pre-screening a user device and using the pre-screened device for receiving one-time-passcodes (OTP) for authentication, in accordance with certain exemplary implementations of the disclosed technology. While the example process 500 illustrates an initial setup of the user device 104 for receiving passcodes via a virtual wallet, some of the steps may be bypassed for continued passcode authentication after the initial setup, and within a given period of pre-screening, confirmation, etc.

In accordance with certain exemplary implementations of the disclosed technology, a user may begin the process 500 by sending a request to access 502 an enterprise server 106 using their user device 104. In certain implementations, the user device 104 may already have a wallet 102 installed. In other implementations, the user may be prompted to download and/or setup a wallet 102 on their user device 104 in response to the request to access 502. The enterprise server 106 may then request additional information from the user device 104 (such as user personally identifiable information (PII), account number, address, phone number, email address, etc., and/or device identification information) to perform an initial enrollment 504, preliminary screening, and/or user account setup, for example, so that the process 500 may continue and/or so that there is enough information collected to initiate the pre-screening steps. In certain exemplary implementations, the enterprise server 106 may send an initial code and/or a wallet card 103 to the user device 104 so that the wallet card 103 may be setup for subsequent pre-screening, etc.

In accordance with certain exemplary implementations of the disclosed technology, the enterprise server 106 may then send a request for device pre-screening 506 to the security server 108. In some implementations, the request for device pre-screening 506 can include certain identifying information about the user device 104 and/or certain non-sensitive user PII (for example, as gathered in the initial enrollment 504) so that the security server 108 may uniquely identify the requesting user and/or user device 104. In certain exemplary implementations, the security server 108 may then generate a pre-screening link (such as a hyperlink) and may provide the pre-screening link 508 to the enterprise server 106, which may then send the pre-screening link 510 to the user device 104. In certain implementations, the pre-screening link can be a custom link or a static link that the user device 104 may use to communicate directly with the security server 108. The custom prescreening link may be generated and sent 510 using data collected during the initial enrollment 504, for example, to allow the same user device 104 registered during the initial enrollment 504 with the enterprise server 106 to continue to the pre-screening process 512. In certain exemplary implementations, a static pre-screening link may be sent 510 to the user device 104 to initiate pre-screening 512 and the security server 108 may be relied upon collect a set of information from the user device 104 for pre-screening, rather than relying on the enterprise server 106 for such information.

According to an exemplary implementation of the disclosed technology, the pre-screening 512 of the user device 104 may involve sub-processes to gather and transmit to the security server 108, certain user PII information and/or device information about the user device 104. Such device information can include specific information about the user device 104, such as a phone number, device serial number, ICCID serial number, IMSI number, MAC address, IP address, IDFA, AAID, pass type ID, authentication token, push token, device library ID, and/or other unique identification information associated with the user device 104. In accordance with certain exemplary implementations of the disclosed technology, the device information gathered and/or verified user PII gathered during the pre-screening process 512 may also be used to determine if the phone number of the user device 104 was ported to a new carrier within a selectable period. In certain implementations, phone number porting history may be used as part of the pre-screening process 512, for example, to identity fraud and identity theft risk. Information may be gathered about how many times a user device 104 phone number has been ported in a given period and when the last port occurred. Such information may be used to qualify data linked to the user device 104. If, for example, the user device 104 phone number was ported to a new carrier within 24 hours (or some other selectable time frame) of requesting access 502, the pre-screening 512 may be halted and pre-screen failure results 512 may be sent to the enterprise server 106 and/or the user device 104.

Multiple phone numbers, for example, landline numbers, cellular phone numbers, work phone numbers, previous phone numbers, etc., can be associated with a given user, and embodiments disclosed herein may provide for weighting, scoring, and/or ranking the multiple phone numbers according to the likelihood that a particular phone number is associated with a particular user and/or a particular user device. In some cases, embodiments of the disclosed technology may be utilized, for example, to determine which of the multiple phone numbers associated with the user are accurate and up-to-date.

Certain example embodiments of the disclosed technology may utilize one or more sources of information, if available, to independently determine a phone number associated with a user. Some implementations may score phone numbers based on various classes of information, and/or combinations of available information. In accordance with various example implementations of the disclosed technology, weighting and/or scoring may utilize empirical information. For example, a phone number may be associated with a particular phone type, such as a cellular phone, a business phone, a residential phone, an Internet-based phone, a landline-based phone, a spoofed phone number, a facsimile machine, etc. Certain example implementations of the disclosed technology may use a different model depending on the phone type. For example, cellular phones and landline phones may be scored using different models to account for differences, not only between such phones but also in how or where associated information is stored. As an example, certain databases may be populated only by data associated with cellular phones.

According to an example implementation of the disclosed technology, a phone number may be scored based on the amount of time that has elapsed since the last known use or activity associated with the phone number. For example, a phone number that was used in the past week may have a higher score than a phone number that was last used a year ago. In certain embodiments, the use, activity, or record associated with the phone number can include one or more of actual use of the phone (for example, placing a call); the presence of the phone number on an application; the presence of the phone number in a public record; the use of the phone number in a private record; an indication of the phone number in a credit application; the use of the phone number in a purchase record; a phone bill; etc. Thus, according to certain embodiments, any number of data sources that indicate usage, activity, or records associated with a phone number can be utilized for the pre-screening process 512.

Certain exemplary implementations of the disclosed technology may be utilized to prevent identity fraud that can occur due to security weaknesses associated with the provisioning and issuance of SIM cards. Certain example implementations of the disclosed technology may also be utilized to prevent fraudulent activity on a lost or stolen mobile device. Many online services, for example, utilize one-time passcodes (OTP) to authenticate a legitimate customers and allow them to access an account, conduct a transaction, reset a password, etc. It is common for the online service to send the OTP to a customer's mobile device using SMS when additional security is warranted. However, instead of strengthening security, it has been discovered that this authentication method combined with the SMS vulnerability allows hackers to intercept the OTP and conduct fraudulent activities.

In certain exemplary implementations, the pre-screening process 512 may involve a determination of SIM swap on the user device within a selectable period. SIM swap fraud occurs, for example, when scammers take advantage of a weakness in two-factor authentication and verification. The term "SIM Swap" refers to a technique where fraudsters trick the mobile carrier into giving them a new device and/or SIM card associated with a legitimate customer's phone account. For example, a fraudster who knows the legitimate customer's phone number along with minimal associated personally identifiable information (PII) can call a mobile phone store and plead: "I dropped my phone in the lake and I need a new phone," or otherwise convince the carrier to associate the legitimate customer's mobile phone account and mobile number with a new device that can then be used by the fraudster. Since it can take time for the legitimate customer to realize they are no longer getting phone calls or text messages, the fraudster may proceed to gain access to an account, merchant, bank, etc. associated with the legitimate customer. If a passcode is sent by the merchant, business, bank, etc. via SMS to the phone number associated with the legitimate customer, the fraudster, by virtue of having ownership of a SIM card associated with the victim's phone number may directly receive the SMS OTPs and could use such information to pass the authentication step. Such SIM swap scenarios are riskier if the mobile device has been recently changed. In other words, a device change that occurred two hours ago presents a much greater risk of fraudulent activity than a device change that occurred two months ago. A recent device change to the user device 104 followed by a high-risk transaction using that device has a high likelihood of being fraudulent. Certain implementations of the disclosed technology utilize such temporal information associated with a detected change to a SIM card to prevent a possibly fraudulent transaction or account access.

In accordance with certain exemplary implementations of the disclosed technology, a SIM swap lookup service may be utilized by the security server 108 to obtain real-time authoritative data directly sourced from mobile network operators to determine whether a SIM linked to a mobile phone number has recently changed. If, for example, the user device 104 had a SIM swap within 24 hours (or some other selectable time frame) of requesting access 502, the pre-screening 512 may be halted and pre-screen failure results 512 may be sent to the enterprise server 106 and/or the user device 104.

In accordance with certain exemplary implementations of the disclosed technology, the security server 108 may be utilized to detect a SIM swap by receiving a first indication of a detected first SIM card installed on the user device 104 at a first time and associated with a first mobile telephone number. The security server 108 may receive a second indication of a detected second SIM card installed on a second mobile device at a second time and associated with the first mobile telephone number, where the second SIM card may differ from the first SIM card. Identifying information related to the detected second SIM card and temporal information related to the second indication may be saved. Certain implementations may receive a third indication including a request to access a server by the second mobile device at a third time. Certain implementations may determine from the stored ID information and temporal information, whether a predetermined time has elapsed between the third time and the second time. In certain exemplary implementations, the pre-screening results and/or subsequent access to the enterprise server 106 may be controlled responsive to this evaluation. In certain exemplary implementations, a Software Developer Kit (SDK) or other application may be installed on the user device 104 to obtain identifying information related to any SIM cards installed on the user device 104. In accordance with an example implementation of the disclosed technology, the security server 108 may be configured to communicate with a carrier associated with user device 104.

In accordance with certain exemplary implementations of the disclosed technology, the pre-screening 512 process may gather biometric and/or behavioral data from the user device 104 as additional security screening to determine whether the user associated with the user device 104 is indeed the individual who is controlling the mobile device 104. In certain implementations, the pre-screening 512 process may run tests with user device 104 to determine if the user device 104 is being controlled remotely. For example, keypress and/or gesture time stamps may be evaluated (for signs of buffering, etc.) and/or compared with historical usage to indicate whether the user device 104 is being controlled by a user associated with the user device 104. If remote control is detected, the pre-screening 512 may be halted and pre-screen failure results 512 may be sent to the enterprise server 106 and/or the user device 104.

Referring again to FIG. 5, once the pre-screening 512 process has been completed, the pre-screening results 514 may be sent to the enterprise server 106. In certain implementations, enrollment results may also be sent to the enterprise server 106, for example, to identify the user device 104 that has either passed or failed the pre-screening process 512.

In accordance with certain exemplary implementations of the disclosed technology, once the user device 104 has successfully passed the pre-screening process 512 (i.e., no detection of security risks, no recent porting, no recent SIM swaps, etc.) the enterprise server 106 may send a request to the security server to push a wallet card 103 to the user device 104. In certain exemplary implementations, the security server 108 may then push 518 the wallet card 103 to the user device 104. In certain implementations, the enterprise server 106 may push a wallet card 103 directly to the user device 104 responsive to receipt indication of clean pre-screening results 514 from the security server 108.

In response to the wallet card 103 being pushed to the user device 104, the user device 104 may send a confirmation 520 to the security server 108 that the card was received by the user device 104. In certain exemplary implementations, the security server 108 may then send to the enterprise server 106 confirmation 522 that the card was received. In certain implementations, the user device 104 may send the confirmation of the received card 520 directly to the enterprise server 106.

In certain exemplary implementations, the steps/processes described up to this point in the process 500 can be considered to be setup steps (e.g., initial enrollment, pre-screening, and wallet setup) while the remaining steps, as will be described below, may be associated with the use of a passcode pushed to the user device 104 for authentication and access to the enterprise server 106. Provided that all or part of the setup steps (502-522) have been completed within a predetermined time limit, the user device 104 may start by requesting access 502 to the enterprise server 106, and in response, the enterprise server 106 may request 524 that the security server 108 push a passcode to the user wallet. Provided that all pre-screening 512 of the user device 512 successfully passed, the security server 108 may generate a push 526 a passcode (such as a one-time-passcode) to the wallet 102 of the user device 104. Upon receipt of the pushed passcode 526, the wallet card 103 may be updated with the new passcode. The user may then confirm the passcode update 528, for example, by entering the pushed passcode 526 into a specific field on the user device 104. In other exemplary implementations, the field may be automatically updated with the pushed passcode 526, and a confirmation of the passcode update 528 may be sent to the security server 108 (or directly to the enterprise server 106). In certain exemplary implementations, the security server 108 may send a confirmation 530 of the updated passcode to the enterprise server 106. In certain exemplary implementations, the enterprise server 106 may then verify 532 that the updated passcode pushed 526 by the security server 108 to the user device 104 matches the received confirmation of the passcode 530.

In accordance with certain exemplary implementations of the disclosed technology, upon verifying 532 that the passcodes match, the enterprise server 106 may authenticate and allow the user device 104 to access 534 the enterprise server 106 (per the initial request for access 502).

Figure 6:
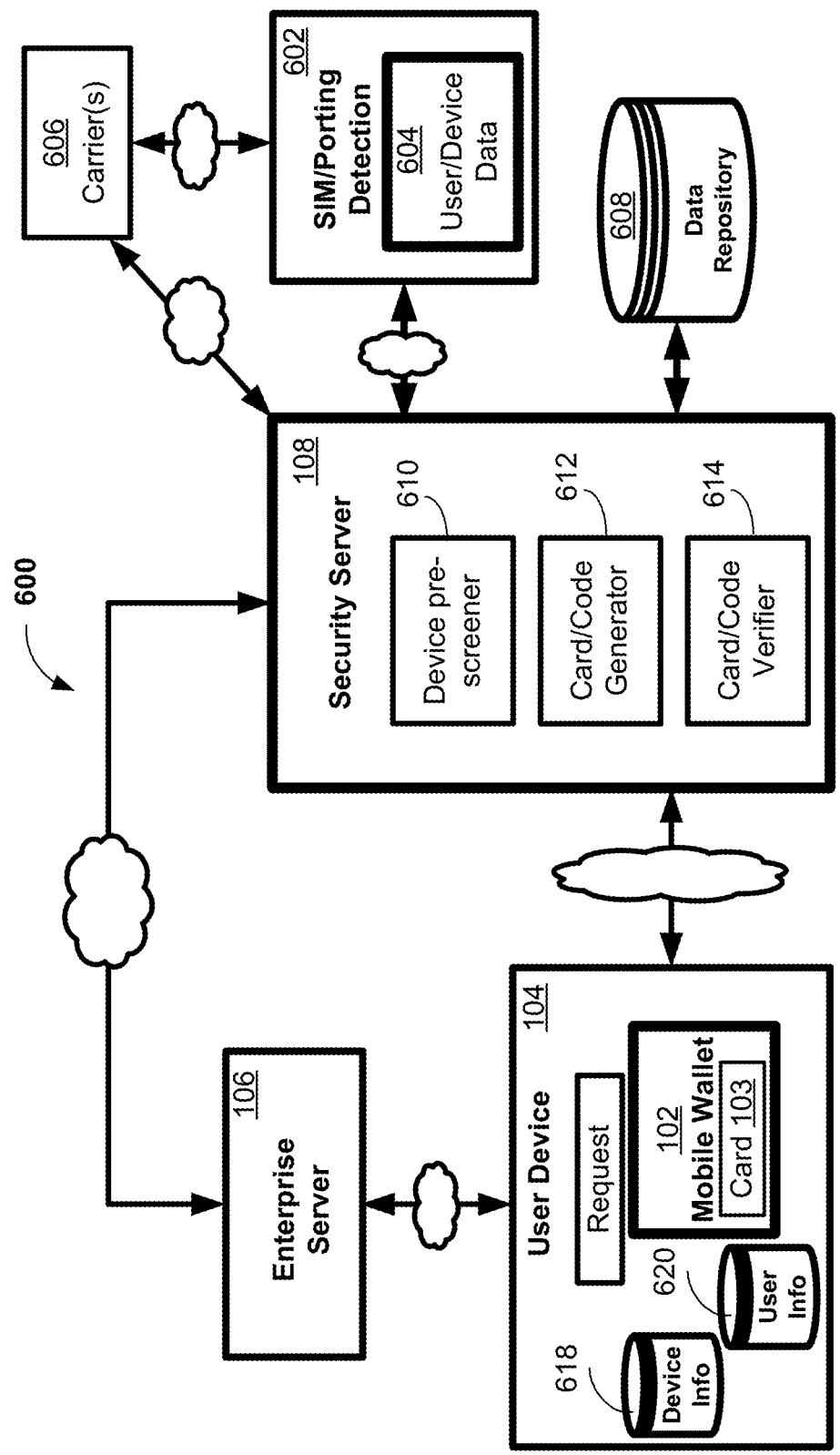
FIG. 6 illustrates an example system configuration for implementing a device pre-screening and authentication process, in accordance with certain exemplary implementations of the disclosed technology.

FIG. 6 illustrates an example system 600 configuration for implementing device pre-screening and authentication (for example, to implement the process 500 as discussed above with reference to FIG. 5, in accordance with certain exemplary implementations of the disclosed technology. In accordance with certain exemplary implementations of the disclosed technology, the system 600 can include a security server 108 that is in communication (via the Internet, for example) with a user device 104 and an enterprise server 106. In certain exemplary implementations, the security server 108 may also be in communication with one or more SIM swap and/or phone number porting detection services 602, which may utilize user and/or device data 604 obtained from the user device 104 in the pre-screening process, as described above. In certain exemplary implementations, the SIM swap and/or phone number porting detection services 602 may be in communication with one or more carriers 606 for obtaining up-to-date SIM swapping and/or porting information.

In accordance with certain exemplary implementations of the disclosed technology, the security server 108 may include a device pre-screener module 610 that may be utilized to conduct the pre-screening process (for example the pre-screening process 512 as described above with respect to FIG. 5). In certain implementations, the security server may include a wallet card generator and/or a passcode generator 612, for example to implement generating and pushing of a passcode and/or a wallet card 103 to the user device 104 (such as described in steps 518 and/or 526 above with respect to FIG. 5). In certain exemplary implementations, the security server 108 may include a card and/or passcode verifier module 614 that may be utilized to confirm that a proper wallet card 103 was written to the user device 104 wallet 102 and/or to confirm and verify that an updated passcode on the user device 104 matched what was pushed to the user device 104 (such as described in steps 520, 528, 530, and 532 above with reference to FIG. 5). In certain exemplary implementations, the security server 108 may be in communication with one or more data repositories 608, for example, that may be used to store and retrieve any of the data utilized in the process.

As illustrated in FIG. 6, the user device 104 may include memory that stores device information 618 and/or user information 620 and such information may be communicated to the security server 108 and/or the enterprise server 106, for example, via a network such as the Internet.

Figure 7:
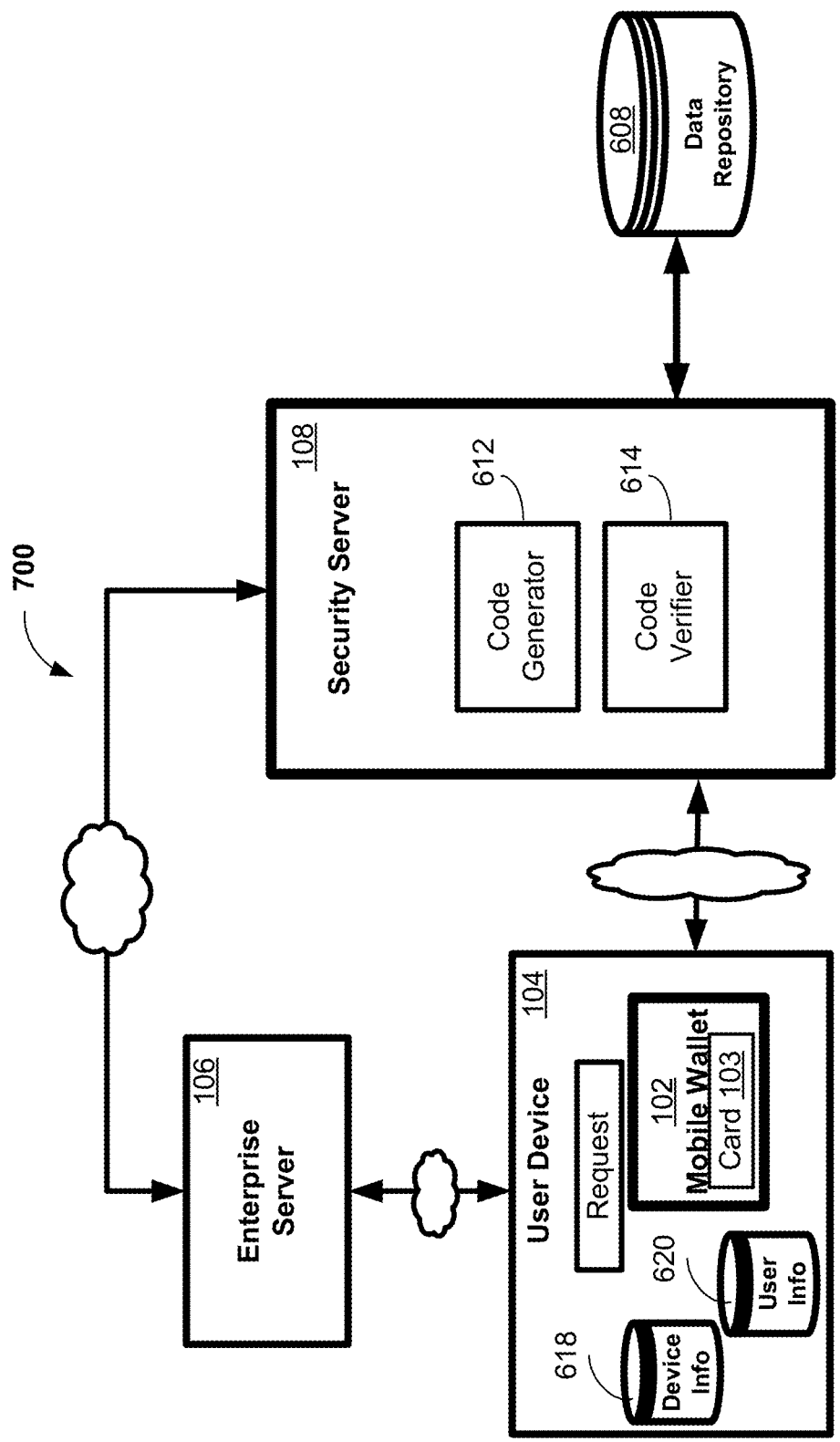
FIG. 7 illustrates an example system configuration for implementing the authentication process, according to an exemplary implementation of the disclosed technology.

FIG. 7 illustrates an example system configuration 700 for implementing the authentication process, according to an exemplary implementation of the disclosed technology. In this illustration (which is similar to FIG. 6), some of the components have been omitted to illustrate that once the user device 104 has been setup with a wallet card 103 and pre-screened (such as discussed above in steps 504-522 if the process 500 with reference to FIG. 5), the example configuration 700 may be used to complete the rest of the process (such as steps 524-534 in the process 500 as discussed above with respect to FIG. 5).

In accordance with certain exemplary implementations of the disclosed technology, the In the Session ID embodiment, the mobile device 102 may utilize cellular data 113 to access a website/web-app that is hosted on the business server 122, for example, using a cellular tower 112 and a network (at least partially) operated by the carrier 114. In this embodiment, when a mobile device 102, 103 accesses a website on the business server 122 via the carrier 114, a unique session identifier is generated, which may be utilized by the threat assessment server 116 or service to request device identification.

In accordance with certain example implementations of the disclosed technology, the example system 600 and/or configuration 700 in FIGS. 6-7 may utilize a session ID workflow embodiments which may include one or more of the following steps:

(i) an enterprise associated with the enterprise server 106 (such as a bank, a merchant etc.) may embed a Device Profiling JavaScript into their website;

(ii) A user device 104 attempts to access the enterprise server 106 (by launching a website of the enterprise server 106 for example, or by following a link provided by the enterprise server 106 for pre-screening by the security server 108) may cause the user device 104 browser to execute Device Intelligence JavaScript;

(iii) the Device Intelligence JavaScript may communicate with the security server 108, which may instruct the user device 104 to begin a carrier validation process (also known as header enrichment);

(iv) the security server 108, may then contact the user device 104 carrier (for example via the SIM/porting detection service 602) to verify the SIM/device information and any relevant porting signals;

(v) For high-profile events, such as large purchases or new accounts requesting large lines of credit, even if the security server 108 determines a positive relationship between the device/SIM data, it may leverage carrier services to explicitly verify the device/SIM card as a matter of caution.

In accordance with certain example implementations of the disclosed technology, the Session ID embodiment may leverage the carrier validation if the device is connected to the carrier's cellular network.

In certain example implementations, the user device 104 may access the enterprise server 106 using an installed mobile app and/or installed browser on the user device 104. In certain example implementations, the security server 108 may be in communication with the enterprise server 106 but may be separate from the enterprise server 106. In other example implementations, the security server 108 may be operational on the enterprise server.

In an example implementation, a linkage may be created when the user device 104 is used to visit a website hosted on (or by) the enterprise server 106. For example, during the initial request to access the website, or during the initial opening of the mobile app, an http/https query may be transmitted from the user device 104 to a mobile carrier 606 that services the user device 104. In certain example implementations, the query may be utilized to establish a connection by creating an encrypted unique session.

In certain example implementations, the unique session identifier, once generated, may be pushed to the security server 108 by the enterprise server 106. A follow-up query using the unique session identifier may then be retransmitted to the identified mobile carrier 606. When the second query request is pushed to the mobile carrier 606 with the unique session identifier, the mobile carrier 606 may decrypt the unique session identifier to permit the unmasking of the telephone number associated with the user device 104. The unmasked telephone number may then be sent back to the security server 108, completing the follow-up queries request. Upon receipt of the completed query, the security server 108 may then create unique linkages to the user device 104 The creation of the linkage may permit the security server 108 to develop the proper relationships of the user device 104 and a unique user.

In certain exemplary implementations, a record of the SIM identification information and phone number of the user device may be stored in the data repository 606 in communication with the security server 108. Thereafter, and according to certain example implementations, subsequent requests by the user device 104 to access the enterprise server 106 may cause the security server 108 to utilize the identifying information to determine if there have been any changes to the user device 104 or SIM card since the previous access to the enterprise server 106 and to further determine from the received ID and temporal information, whether a predetermined time has elapsed after the change. Such determinations may be utilized when changes to the SIM information have recently occurred indicating a possible SIM swap, and such information may be used to control access to the enterprise server by the requesting user device 104. In certain example implementations, when less than a minimum predetermined amount of time has elapsed after a SIM swap detection, certain transactions may be prevented, and/or a different form of authentication may be required.

Figure 8:
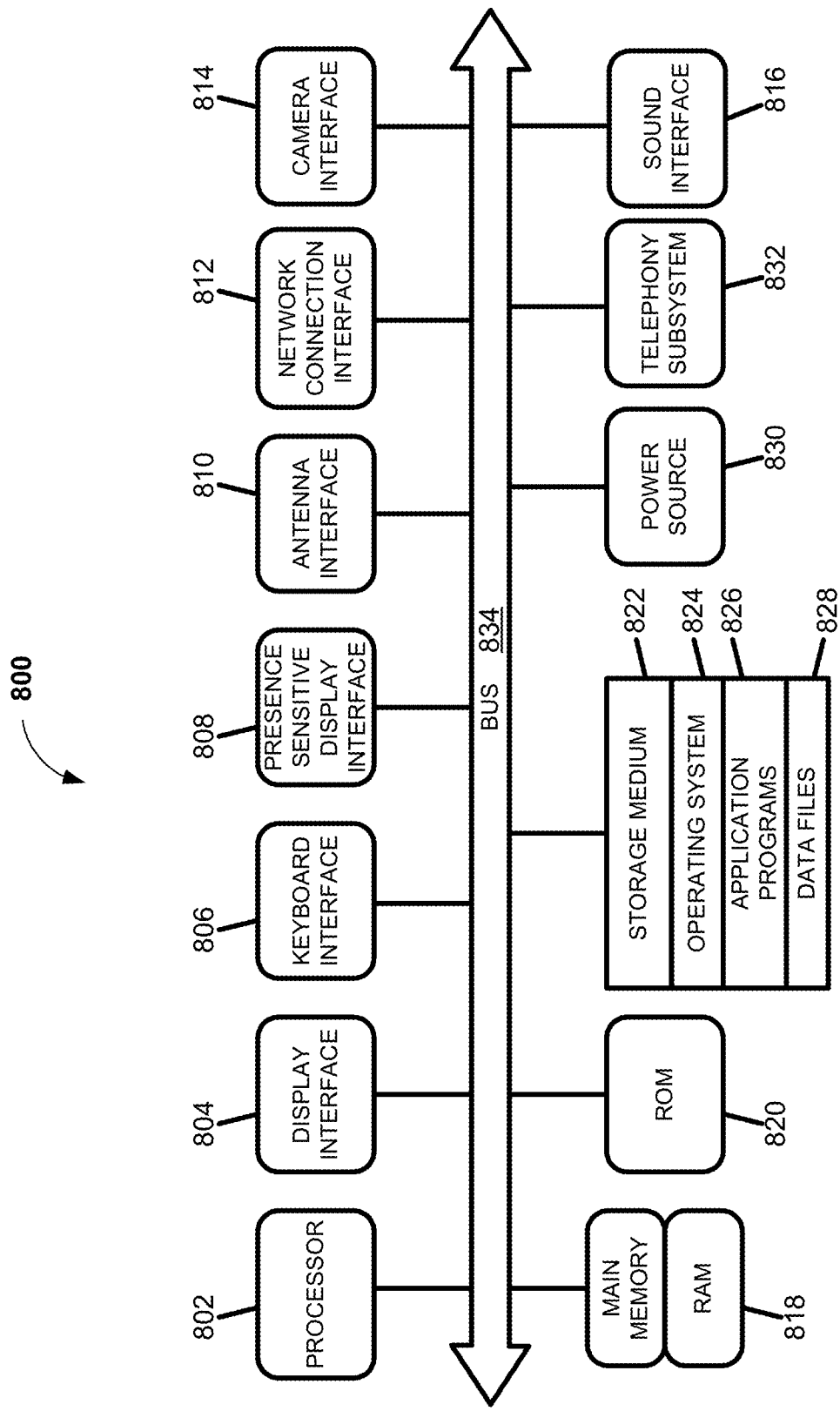
FIG. 8 illustrates a computing device that may be utilized with various embodiments of the disclosed technology.

FIG. 8 depicts a block diagram of an illustrative computing device 800 that may be utilized to enable certain aspects of the disclosed technology. Various implementations and methods herein may be embodied in non-transitory computer-readable media for execution by a processor. It will be understood that the computing device 800 is provided for example purposes only and does not limit the scope of the various implementations of the communication systems and methods.

The computing device 800 of FIG. 8 includes one or more processors where computer instructions are processed. The computing device 800 may comprise the processor 802, or it may be combined with one or more additional components shown in FIG. 8. In some instances, a computing device may be a processor, controller, or central processing unit (CPU). In yet other instances, a computing device may be a set of hardware components.

The computing device 800 may include a display interface 804 that acts as a communication interface and provides functions for rendering video, graphics, images, and texts on the display. In certain example implementations of the disclosed technology, the display interface 804 may be directly connected to a local display. In another example implementation, the display interface 804 may be configured for providing data, images, and other information for an external/remote display. In certain example implementations, the display interface 804 may wirelessly communicate, for example, via a Wi-Fi channel or other available network connection interface 812 to the external/remote display.

In an example implementation, the network connection interface 812 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 804 may be operatively coupled to a local display. In another example, the display interface 804 may wirelessly communicate, for example, via the network connection interface 812 such as a Wi-Fi transceiver to the external/remote display.

The computing device 800 may include a keyboard interface 806 that provides a communication interface to a keyboard. According to certain example implementations of the disclosed technology, the presence-sensitive display interface 808 may provide a communication interface to various devices such as a pointing device, a touch screen, etc.

The computing device 800 may be configured to use an input device via one or more of input/output interfaces (for example, the keyboard interface 806, the display interface 804, the presence-sensitive display interface 808, network connection interface 812, camera interface 814, sound interface 816, etc.) to allow a user to capture information into the computing device 800. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 800 or may be a separate device. For example, the input device may be an accelerometer, a magnetometer, a digital camera, a microphone, and an optical sensor.

Example implementations of the computing device 800 may include an antenna interface 810 that provides a communication interface to an antenna; a network connection interface 812 that provides a communication interface to a network. According to certain example implementations, the antenna interface 810 may utilize to communicate with a Bluetooth transceiver.

In certain implementations, a camera interface 814 may be provided that acts as a communication interface and provides functions for capturing digital images from a camera. In certain implementations, a sound interface 816 is provided as a communication interface for converting sound into electrical signals using a microphone and for converting electrical signals into sound using a speaker. According to example implementations, random-access memory (RAM) 818 is provided, where computer instructions and data may be stored in a volatile memory device for processing by the CPU 802.

According to an example implementation, the computing device 800 includes a read-only memory (ROM) 820 where invariant low-level system code or data for basic system functions such as basic input and output (I/O), startup, or reception of keystrokes from a keyboard are stored in a non-volatile memory device. According to an example implementation, the computing device 800 includes a storage medium 822 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 824, application programs 826 (including, for example, a web browser application, a widget or gadget engine, and or other applications, as necessary) and data files 828 are stored. According to an example implementation, the computing device 800 includes a power source 830 that provides an appropriate alternating current (AC) or direct current (DC) to power components. According to an example implementation, the computing device 800 includes a telephony subsystem 832 that allows the device 800 to transmit and receive sound over a telephone network. The constituent devices and the CPU 802 communicate with each other over a bus 834.

In accordance with an example implementation, the CPU 802 has an appropriate structure to be a computer processor. In one arrangement, the computer CPU 802 may include more than one processing unit. The RAM 818 interfaces with the computer bus 834 to provide quick RAM storage to the CPU 802 during the execution of software programs such as the operating system application programs, and device drivers. More specifically, the CPU 802 loads computer-executable process steps from the storage medium 822 or other media into a field of the RAM 818 to execute software programs. Data may be stored in the RAM 818, where the data may be accessed by the computer CPU 802 during execution. In one example configuration, the device 800 includes at least 128 MB of RAM, and 256 MB of flash memory.

The storage medium 822 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 800 to access computer-executable process steps, application programs, and the like, stored on removable and non-removable memory media, to off-load data from the device 800 or to upload data onto the device 800. A computer program product, such as one utilizing a communication system may be tangibly embodied in storage medium 822, which may comprise a machine-readable storage medium.

According to one example implementation, the term computing device, as used herein, may be a CPU, or conceptualized as a CPU (for example, the CPU 802 of FIG. 8). In this example implementation, the computing device (CPU) may be coupled, connected, and/or in communication with one or more peripheral devices.

Figure 9:
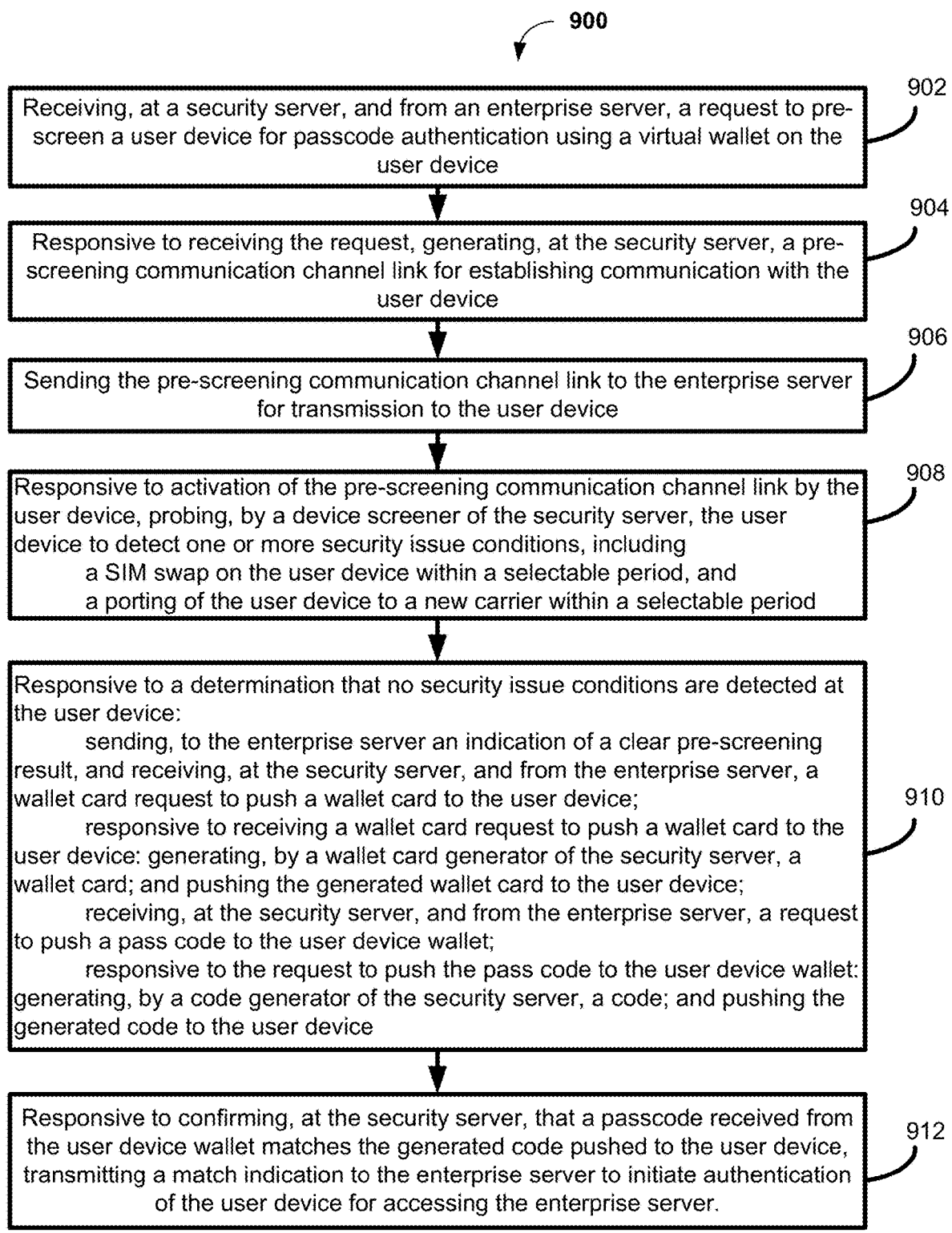
FIG. 9 is a flow diagram of an example method, in accordance with certain exemplary implementations of the disclosed technology.

FIG. 9 is a flow diagram of a method 900 for pre-screening and authenticating a mobile computing device for passcode authentication using a virtual wallet. In block 902, the method 900 includes receiving, at a security server, and from an enterprise server, a request to pre-screen a user device for passcode authentication using a virtual wallet on the user device. In block 904, the method 900 includes, responsive to receiving the request, generating, at the security server, a pre-screening communication channel link for establishing communication with the user device. In block 906, the method 900 includes sending the pre-screening communication channel link to the enterprise server for transmission to the user device. In block 908, the method 900 includes, responsive to activation of the pre-screening communication channel link by the user device, probing, by a device screener of the security server, the user device to detect one or more security issue conditions, including a SIM swap on the user device within a selectable period, and a porting of the user device to a new carrier within a selectable period. In block 910, the method 900 includes, responsive to a determination that no security issue conditions are detected at the user device: sending, to the enterprise server an indication of a clear pre-screening result, and receiving, at the security server, and from the enterprise server, a wallet card request to push a wallet card to the user device; responsive to receiving a wallet card request to push a wallet card to the user device: generating, by a wallet card generator of the security server, a wallet card; and pushing the generated wallet card to the user device; receiving, at the security server, and from the enterprise server, a request to push a passcode to the user device wallet; and responsive to the request to push the passcode to the user device wallet: generating, by a code generator of the security server, a code; and pushing the generated code to the user device. In block 912, the method 900 includes, responsive to confirming, at the security server, that a passcode received from the user device wallet matches the generated code pushed to the user device, transmitting a match indication to the enterprise server to initiate authentication of the user device for accessing the enterprise server.

Certain exemplary implementations of the disclosed technology can further include responsive to a determination that one or more security issue conditions are detected at the user device, sending, to the enterprise server, an indication of a failed pre-screening result; and preventing a code from being pushed to the user device.

In certain exemplary implementations, code may be a one-time-passcode (OTP).

In certain exemplary implementations, the code may be valid for a selectable period.

In certain exemplary implementations, the one or more security issue conditions can include an indication that the user device is jailbroken.

In certain exemplary implementations, the one or more security issue conditions can include an indication that the user device is located in a geographic region that differs by more than a selectable distance from a determined residence region associated with the user device.

Certain exemplary implementations of the disclosed technology can include receiving at the security server, a confirmation that the wallet card was written to the user device.

In certain exemplary implementations, the request to pre-screen a user device for passcode authentication using a virtual wallet on the user device may be responsive to a request by the user device to access an account on the enterprise server.

Certain exemplary implementations of the disclosed technology may include performing, by the security server, a process to enroll the enterprise server for passcode authentication using a virtual wallet.

Figure 10:
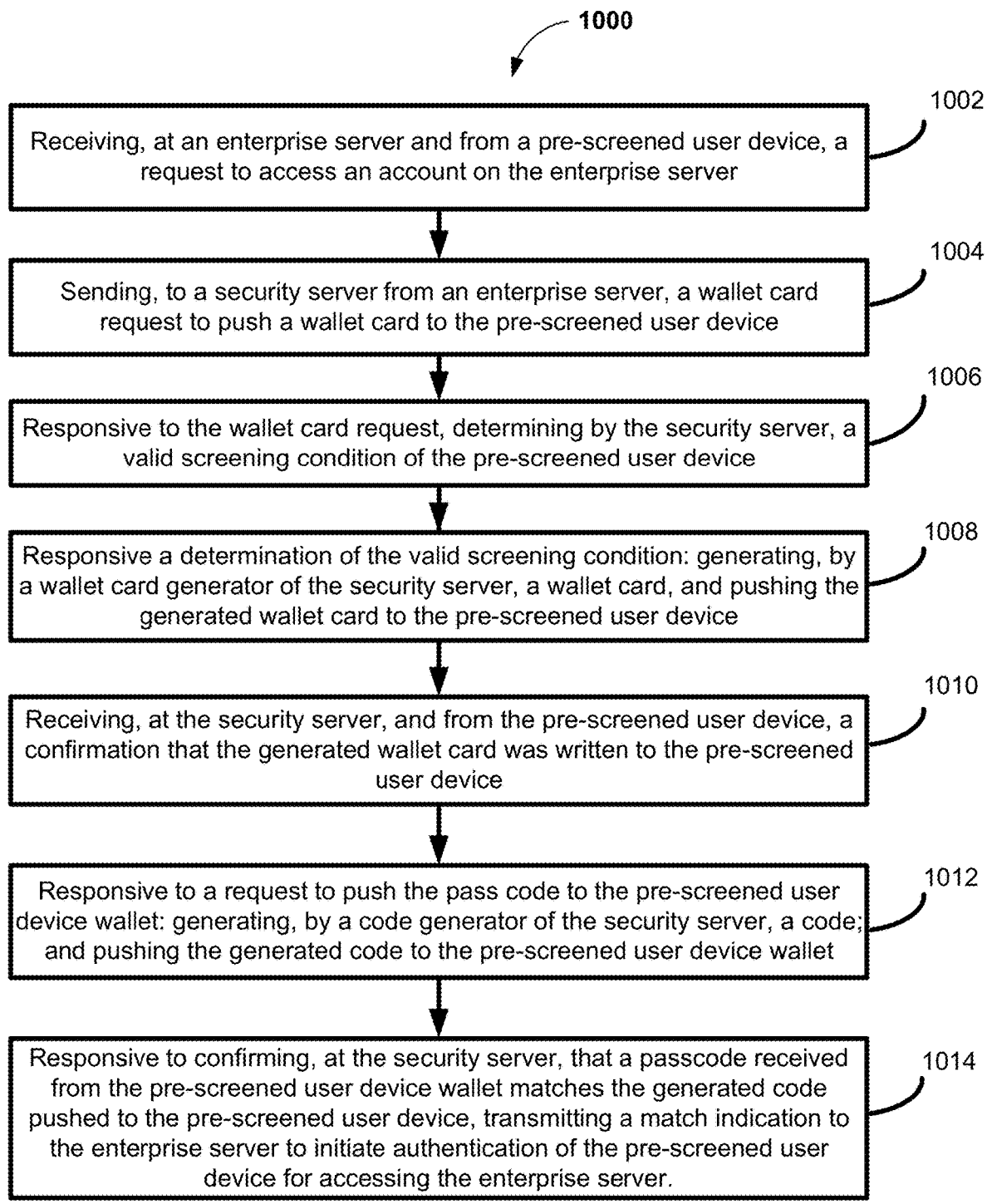
FIG. 10 is a flow diagram of an example method, in accordance with certain exemplary implementations of the disclosed technology.

FIG. 10 is a flow diagram of a method 1000 for authenticating a mobile computing device for passcode authentication using a virtual wallet. In block 1002, the method 1000 includes receiving, at an enterprise server and from a pre-screened user device, a request to access an account on the enterprise server. In block 1004, the method 1000 includes, sending, to a security server from an enterprise server, a wallet card request to push a wallet card to the pre-screened user device. In block 1006, the method 1000 includes, responsive to the wallet card request, determining by the security server, a valid screening condition of the pre-screened user device. In block 1008, the method 1000 includes, responsive a determination of the valid screening condition: generating, by a wallet card generator of the security server, a wallet card, and pushing the generated wallet card to the pre-screened user device. In block 1010, the method 1000 includes receiving, at the security server, and from the pre-screened user device, a confirmation that the generated wallet card was written to the pre-screened user device. In block 1012, the method 1000 includes, responsive to a request to push the passcode to the pre-screened user device wallet: generating, by a code generator of the security server, a code; and pushing the generated code to the pre-screened user device wallet. In block 1014, the method 1000 includes, responsive to confirming, at the security server, that a passcode received from the pre-screened user device wallet matches the generated code pushed to the pre-screened user device, transmitting a match indication to the enterprise server to initiate authentication of the pre-screened user device for accessing the enterprise server.

Certain exemplary implementations of the disclosed technology can include receiving, at the security server, and from the enterprise server, a request to pre-screen a user device for passcode authentication using a virtual wallet on the user device. Responsive to receiving the request, the disclosed technology can include generating, at the security server, a pre-screening communication channel link for establishing communication with the user device and sending the pre-screening communication channel link to the enterprise server for transmission to the user device. Responsive to activation of the pre-screening communication channel link by the user device, the disclosed technology can include probing, by a device screener of the security server, the user device to detect one or more security issue conditions, including but not limited to: a SIM swap on the user device within a selectable period; a porting of the user device to a new carrier within a selectable period; a jailbroken user device; and/or that the user device is located in a geographic region that differs by more than a selectable distance from a determined residence region associated with the user device. Responsive to a determination that no security issue conditions are detected at the user device, the disclosed technology can include sending, to the enterprise server, an indication of a clear pre-screening result.

Responsive to a determination that one or more security issue conditions are detected at the user device, the disclosed technology can include sending, to the enterprise server, an indication of a failed pre-screening result, and/or preventing a code from being pushed to the user device.

Certain exemplary implementations of the disclosed technology can include performing, by the security server, a process to enroll the enterprise server for passcode authentication using a virtual wallet.

Certain exemplary implementations of the disclosed technology can include sending, to the enterprise server, and from the security server the confirmation that the generated wallet card was written to the pre-screened user device.

Certain exemplary implementations of the disclosed technology can include receiving, at the security server, and from the enterprise server, a request to push a passcode to the pre-screened user device wallet. In some implementations, the code is a one-time-passcode (OTP). In some implementations, the code is valid for a selectable period.

As used herein, the terms "data," "content," "information," and similar terms may be used interchangeably to refer to data capable of being transmitted, received, and/or stored in accordance with the disclosed technology. Thus, the use of any such terms should not be taken to limit the spirit and scope of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the terms "user" or "client," may be used interchangeably to refer, without limitation, to a human, client, customer, purchaser, shopper, user, and the like who may be using any number of client devices and/or online identities to receive and interact with networked digital content.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still, further, example embodiments may be embodied by any of a variety of mobile devices, such as a portable digital assistant (PDA), mobile telephone, smartphone, laptop computer, tablet computer, wearable, or any combination of the aforementioned devices.

As will be appreciated, any such computer program instructions and/or another type of code may be loaded onto a computer, processor, or other programmable apparatus's circuitry to produce a machine, such that the computer, processor or other programmable circuitry that executes the code on the machine creates the means for implementing various functions, including those described herein.

It is also noted that all or some of the information presented by the example displays discussed herein can be based on data that is received, generated, and/or maintained by one or more components of apparatuses herein. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the subject matter and the operations described herein can be implemented in digital electronic circuitry, computer software, firmware, or hardware, including the structures, disclosed in this specification and their structural equivalents, or combinations of one or more of them. Embodiments of the subject matter described herein can be implemented as one or more computer programs, i.e., one or more modules of computer program instructions encoded on the computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "user device," "computing devices," and "mobile computing devices" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or another unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flow described herein can be performed by one or more programmable processors executing one or more computer programs to perform actions by operating on input information/data and generating output. Processors suitable for the execution of a computer program include, by way of example, both general and special purpose microprocessors, and one or more processors of any kind of digital computer. Generally, a processor will receive instructions and information/data from a read-only memory or a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

As utilized herein, the term "or" is used herein in both the alternative and conjunctive sense, unless otherwise indicated. The terms "illustrative" and "exemplary" are used to be examples with no indication of quality level. Like numbers refer to like elements throughout.

While this specification contains many specific implementation details, these should not be construed as limitations on the scope of any disclosures or of what may be claimed, but rather as descriptions of features specific to embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated with a single software product or packaged into multiple software products.

Thus, particular embodiments of the subject matter have been described. Other embodiments are within the scope of the following claims. In some cases, the actions recited in the claims can be performed in a different order and still achieve desirable results. Also, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for pre-screening and authenticating a user device for passcode authentication using a virtual wallet on the user device, the method comprising:
   receiving, at a security server, and from an enterprise server, a request to pre-screen the user device for passcode authentication using the virtual wallet on the user device;
   responsive to receiving the request, generating, at the security server, a pre-screening communication channel link for establishing communication with the user device;
   sending the pre-screening communication channel link to the enterprise server for transmission to the user device;
   responsive to activation of the pre-screening communication channel link by the user device, probing, by a device screener of the security server, the user device to detect one or more security issue conditions, comprising:
      a SIM swap on the user device within a selectable period; and
      a porting of the user device to a new carrier within a selectable period;
   responsive to a determination that no security issue conditions are detected at the user device:
      sending, to the enterprise server an indication of a clear pre-screening result;
      receiving, at the security server, and from the enterprise server, a request to push a wallet card to the virtual wallet on the user device;
      responsive to receiving the-request to push the wallet card to the virtual wallet on the user device:
         generating, by a wallet card generator of the security server, the wallet card; and
         pushing the wallet card to the virtual wallet on the user device;
      receiving, at the security server, and from the enterprise server, a request to push a passcode to the wallet card;
      responsive to the request to push the passcode to the wallet card:
         generating, by a code generator of the security server, a code; and
         pushing the code to the virtual wallet on the user device;
   responsive to confirming, at the security server, that the passcode received from the wallet card matches the code pushed to the virtual wallet on the user device, transmitting a match indication to the enterprise server to initiate authentication of the user device for accessing the enterprise server.

2. The method of claim 1, further comprising:
   responsive to a determination that one or more security issue conditions are detected at the user device:

sending, to the enterprise server, an indication of a failed pre-screening result; and preventing a code from being pushed to the user device.

3. The method of claim 1, wherein the code is a one-time-passcode (OTP).

4. The method of claim 1, wherein the code is valid for a selectable period.

5. The method of claim 1, wherein the one or more security issue conditions further comprise an indication that the user device is jailbroken.

6. The method of claim 1, wherein the one or more security issue conditions further comprise an indication that the user device is located in a geographic region that differs by more than a selectable distance from a determined residence region associated with the user device.

7. The method of claim 1, further receiving at the security server, a confirmation that the wallet card was written to the user device.

8. The method of claim 1, wherein the request to pre-screen the user device for passcode authentication using the virtual wallet on the user device is responsive to a request by the user device to access an account on the enterprise server.

9. The method of claim 1, further comprising performing, by the security server, a process to enroll the enterprise server for passcode authentication using the virtual wallet.

10. A computer-implemented method for passcode authentication using a wallet card and a virtual wallet of a pre-screened user device, the method comprising:

receiving, at an enterprise server and from the pre-screened user device, a request to access an account on the enterprise server;

sending, to a security server from the enterprise server, a request to push the wallet card to the virtual wallet of the pre-screened user device;

responsive to the request, determining by the security server, a valid screening condition of the pre-screened user device;

responsive to the determining the valid screening condition:

generating, by a wallet card generator of the security server, the wallet card; and pushing the wallet card to the virtual wallet of the pre-screened user device;

receiving, at the security server, and from the pre-screened user device, a confirmation that the wallet card was written to the virtual wallet of the pre-screened user device;

responsive to a request to push a passcode to the wallet card;

generating, by a code generator of the security server, a code; and pushing the code to the virtual wallet of the pre-screened user device;

responsive to confirming, at the security server, that the passcode received from the wallet card matches the generated code pushed to the virtual wallet: transmitting a match indication to the enterprise server to initiate authentication of the pre-screened user device for accessing the enterprise server.

11. The method of claim 10, further comprising receiving, at the security server, and from the enterprise server, a request to pre-screen the user device for passcode authentication using the virtual wallet on the user device;

responsive to receiving the request, generating, at the security server, a pre-screening communication channel link for establishing communication with the user device;

sending the pre-screening communication channel link to the enterprise server for transmission to the user device;

responsive to activation of the pre-screening communication channel link by the user device, probing, by a device screener of the security server, the user device to detect one or more security issue conditions, comprising:

a SIM swap on the user device within a selectable period; and a porting of the user device to a new carrier within a selectable period;

responsive to a determination that no security issue conditions are detected at the user device, sending, to the enterprise server, an indication of a clear pre-screening result.

12. The method of claim 11, further comprising:

responsive to a determination that one or more security issue conditions are detected at the user device:

sending, to the enterprise server, an indication of a failed pre-screening result; and preventing a code from being pushed to the user device.

13. The method of claim 11, wherein the one or more security issue conditions further comprise an indication that the user device is jailbroken.

14. The method of claim 11, wherein the one or more security issue conditions further comprise an indication that the user device is located in a geographic region that differs by more than a selectable distance from a determined residence region associated with the user device.

15. The method of claim 11, wherein the request to pre-screen the user device for passcode authentication using the virtual wallet is responsive to a request by the user device to access an account on the enterprise server.

16. The method of claim 11, further comprising performing, by the security server, a process to enroll the enterprise server for passcode authentication using the virtual wallet.

17. The method of claim 10, further comprising sending, to the enterprise server, and from the security server a confirmation that the wallet card was written to the pre-screened user device.

18. The method of claim 10, further comprising receiving, at the security server, and from the enterprise server, a request to push a passcode to the pre-screened user device wallet.

19. The method of claim 10, wherein the code is a one-time-passcode (OTP).

20. The method of claim 10, wherein the code is valid for a selectable period.

* * * * *